US012705410B2

(12) United States Patent
Dudha et al.

(10) Patent No.: US 12,705,410 B2
(45) Date of Patent: Aug. 11, 2026

(54) RETIMING SEQUENTIAL ELEMENTS HAVING INITITAL STATES

(71) Applicant: Xilinx, Inc., San Jose, CA (US)

(72) Inventors: Chaithanya Dudha, San Jose, CA (US); Ruibing Lu, Santa Clara, CA (US); Shangzhi Sun, San Jose, CA (US); Nithin Kumar Guggilla, Hyderabad (IN)

(73) Assignee: XILINX, INC., San Jose, CA (US)

( * ) Notice: Subject to any disclaimer, the term of this patent is extended or adjusted under 35 U.S.C. 154(b) by 827 days.

(21) Appl. No.: 18/102,490

(22) Filed: Jan. 27, 2023

(65) Prior Publication Data

US 2024/0256749 A1 Aug. 1, 2024

(51) Int. Cl.

*G06F 30/3312* (2020.01)
*G06F 30/392* (2020.01)
*G06F 30/394* (2020.01)
*G06F 119/12* (2020.01)

(52) U.S. Cl.

CPC ........ *G06F 30/3312* (2020.01); *G06F 30/392* (2020.01); *G06F 30/394* (2020.01); *G06F 2119/12* (2020.01)

(58) Field of Classification Search

CPC ...... G06F 30/32; G06F 30/347; G06F 30/367; G06F 30/337; G06F 30/3315; G06F 30/343; G06F 30/3312; G06F 30/392; G06F 30/394; G06F 2119/12; G06F 30/327; G06F 30/34

USPC .......................................................... 716/113

See application file for complete search history.

(56) References Cited

U.S. PATENT DOCUMENTS

| | | | | |
|---|---|---|---|---|
| 10,289,786 | B1 | 5/2019 | Dudha et al. | |
| 10,606,979 | B1 | 3/2020 | Sun et al. | |
| 10,678,983 | B1 | 6/2020 | Sun et al. | |
| 10,726,175 | B1 | 7/2020 | Dudha et al. | |
| 10,990,736 | B1 | 4/2021 | Dudha et al. | |
| 2018/0349544 | A1* | 12/2018 | Iyer | G06F 30/392 |
| 2019/0228128 | A1* | 7/2019 | Le | G06F 30/398 |

OTHER PUBLICATIONS

Karolina Netolicka, "Equivalence Checking of Retimed Circuits", Department of Electrical Engineering and Computer Science, Massachusetts Institute of Technology, Jun. 2005, Copyright 2005.

* cited by examiner

*Primary Examiner* — Paul Dinh

(74) *Attorney, Agent, or Firm* — Patterson + Sheridan, LLP

(57) ABSTRACT

Retiming a circuit design can include determining whether or not an initial value specified for a candidate register can be removed based on an input logic cone to the candidate register and an output logic cone from the candidate register. The candidate register is a register in a critical path in the circuit design. The candidate register can be retimed into a retimed register in response to determining that the initial value specified for the candidate register can be removed. A new initial value for the retimed register can be derived based on initial values of registers in a logic cone of the retimed register, and the new initial value can be assigned to the retimed register.

20 Claims, 7 Drawing Sheets

RETIMING SEQUENTIAL ELEMENTS HAVING INITITAL STATES

TECHNICAL FIELD

The disclosure generally relates to retiming sequential elements having initial states.

BACKGROUND

Implementing a circuit design within an integrated circuit (IC), whether a programmable IC or an application specific IC (ASIC), entails processing the circuit design through a design flow. The design flow includes multiple, different phases, which generally include synthesis, placement, and routing.

Synthesis refers to the process of converting, or translating, an abstract, programmatic description of a circuit into a low-level design implementation. The abstract, programmatic description of the circuit describes behavior of the circuit and is also referred to as a "behavioral description" or a "register transfer level (RTL) description" of the circuit. The behavioral description is often specified using a hardware description language (HDL). The low-level design implementation generated through synthesis typically is specified as inter-connected logic gates referred to as a netlist.

Synthesis may also include mapping. Mapping is the process of correlating, or matching, the logic gates of the low-level circuit design to the various types of physical circuit blocks that are actually available in the particular IC in which the circuit design is to be implemented, i.e., the "target IC." For example, since a lookup table (LUT) may implement a complex function, one or more logic gates of the low-level design implementation may be mapped to a single LUT or other programmable tile of the target IC. The mapped circuit design specifies the same functionality as the low-level design implementation, albeit in terms of the particular circuit blocks available on the target IC as opposed to low-level logic gates.

Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned. Routing is the process of selecting particular routing resources such as wires, programmable interconnect points (PIPs), PIP settings, and/or other interconnect circuitry to electrically couple the various circuit blocks of the target IC after placement.

Modern circuit designs often have aggressive timing, area, and/or power requirements. One approach taken by design tools to improve the timing, area, and/or power of the circuit design is retiming. Retiming is an optimization technique in which sequential circuit elements (i.e., flip-flops or "registers" for brevity) are moved across combinational logic to improve the design performance without affecting the input/output behavior of the circuit. Significant time can be spent processing the circuit design through the design flow in an attempt to meet these requirements.

SUMMARY

A disclosed method includes determining by a design tool whether or not an initial value specified for a candidate register can be removed based on an input logic cone to the candidate register and an output logic cone from the candidate register. The candidate register is a register in a critical path in a circuit design. The method includes retiming the candidate register into a retimed register by the design tool in response to determining that the initial value specified for the candidate register can be removed. The method includes deriving a new initial value for the retimed register by the design tool based on initial values of registers in a logic cone of the retimed register, and assigning the new initial value to the retimed register by the design tool.

A disclosed system includes one or more computer processors configured to execute program code and a memory arrangement coupled to the one or more computer processors. The memory arrangement is configured with instructions of a design tool that when executed by the one or more computer processors cause the one or more computer processors to perform operations including determining whether or not an initial value specified for a candidate register can be removed based on an input logic cone to the candidate register and an output logic cone from the candidate register. The candidate register is a register in a critical path in a circuit design. The operations include retiming the candidate register into a retimed register in response to determining that the initial value specified for the candidate register can be removed. The operations include deriving a new initial value for the retimed register based on initial values of registers in a logic cone of the retimed register and assigning the new initial value to the retimed register.

Other features will be recognized from consideration of the Detailed Description and Claims, which follow.

BRIEF DESCRIPTION OF THE DRAWINGS

Various aspects and features of the methods and system will become apparent upon review of the following detailed description and upon reference to the drawings in which.

DETAILED DESCRIPTION

Figure 1:
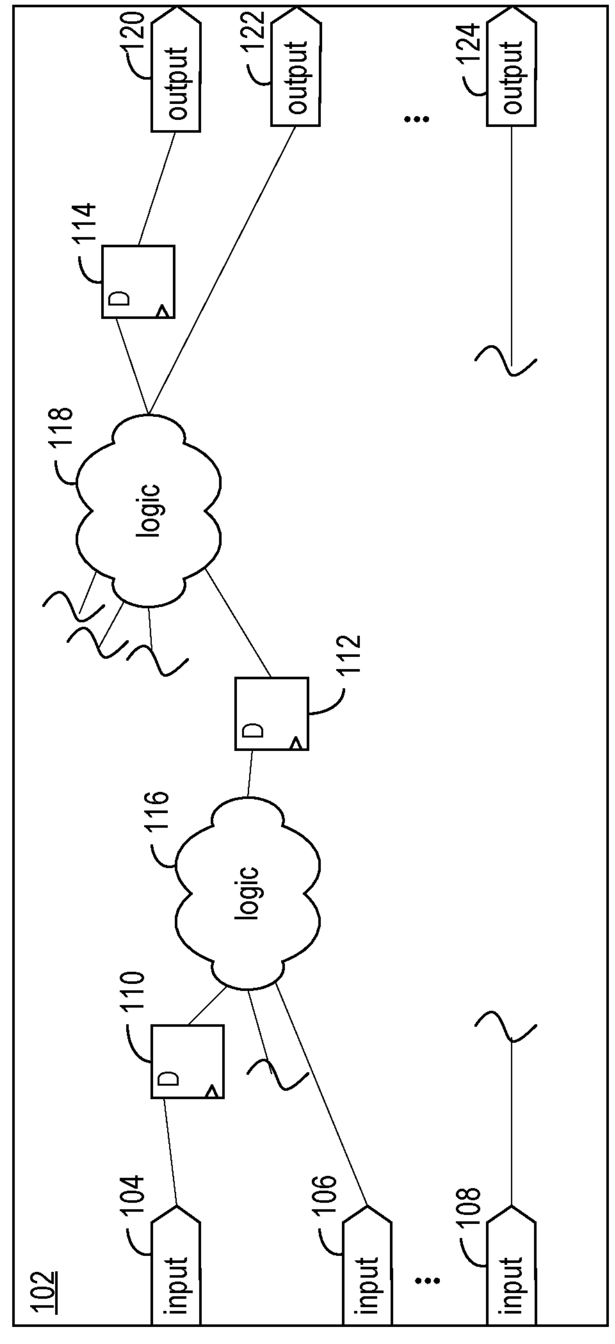
FIG. 1 shows a portion of an exemplary circuit design having a candidate register for retiming.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Some circuits require a known "initial state" of the registers at "startup" or "initialization time," which is the time the circuit first begins operating with a free running clock signal. The initial value of a register is either logic 0 or logic 1, and the initial values of all the registers is the initial state. In retiming a circuit design, finding an equivalent initial state is essential for maintaining correct circuit behavior. An equivalent initial state of a retimed circuit is a state such that for any given input stimulus, the original circuit and the retimed circuit produce the same result if both circuits start from their respective initial states. Handling initial state assignments/conflicts for retiming can be a difficult problem, except for a limited number of trivial cases. More complicated cases can sometimes be handled by replicating logic. However, the additional circuit area may exceed design requirements. There are many cases where finding an equivalent initial state may be infeasible using current techniques.

The disclosed approaches applied to retiming can improve the feasibility of finding an equivalent initial state. This disclosed approaches resolve conflicts between initial values of registers and thereby can help to avoid retiming failures and/or reduce additional area introduced in retiming, and ultimately help to achieve better performance in the implemented circuit. According to the methods and systems, a design tool determines whether or not a candidate register can be retimed by determining whether the initial value of the retimed register is relevant, based on the input logic cone to and the output logic cone from the candidate register. If the initial value of the candidate register is not relevant to the output logic cone, the candidate can be retimed into a retimed register. The initial value of retimed registers can be derived from the logic cones of the retimed registers.

FIG. 1 shows a portion of an exemplary circuit design having a candidate register for retiming. The circuit design 102 includes primary inputs 104, 106, . . . , 108, registers 110, 112, and 114, sequences 116 and 118 of combinational logic, and primary outputs 120, 122, . . . , 124. A primary input of a circuit design is a port or pin for receiving a signal from a source external to the circuit design, and a primary output of a circuit design is a port or pin for sending a signal to a destination external to the circuit design. The circuit design can specify initial values for the primary inputs, registers, and primary outputs.

There are two different types of retiming, backward retiming and forward retiming. Backward retiming of a register removes the register from the output of combinational logic, and creates new registers at the inputs of that combinational logic. Forward retiming of a register removes the register from the input of combinational logic, and inserts a new register at the output of that combinational logic. For a register to be retimed, the circuit behavior after retiming must be the same as the circuit behavior before retiming. If the circuit behavior differs, the register cannot be retimed.

The initial values of registers and combinational logic in the input and output logic cones of a register can affect whether or not that register can be retimed. As an example, register 112 is a candidate register for retiming. The disclosed approaches determine whether or not a candidate register can be retimed based on the input and output logic cones of the register and the possible initial values of the register. The input logic cone of a candidate register contains the register(s) and/or primary input(s) that are connected to the inputs of the combinational logic that provides the input to the candidate register. The register(s) and/or primary input(s) in the input logic cone are referred to as the "starting points." In the example, register 110 and primary input 106 are the starting points for candidate register 112. The output logic cone of a candidate register contains the register(s) and/or primary output(s) that are connected to the combinational logic that receives the output from the candidate register. The register(s) and/or primary output(s) in the output logic cone are referred to as the "reachable endpoints." In the example, register 114 and primary output 122 are reachable endpoints in the output logic cone of candidate register 112.

Simulations involving the initial values of the starting points 110 and 106, the combinational logic 116, alternative initial values of candidate register 112, the combinational logic 118 can be performed to determine whether or not candidate register 112 can be retimed, based on values of the reachable endpoints 114 and 122 at the end of the simulations.

For a register that is backward retimed, the initial values of the backward retimed registers are derived from the initial values of the reachable endpoints and the intervening combinational logic. For a register that is forward retimed, the initial value is derived from the initial values of the starting points and the intervening logic.

In some instances, conflicts can arise in deriving the initial value of a retimed register. For example, the initial values of reachable endpoints may require the retimed register to have different initial values. In another example, the retimed register may be combined with an existing register, and the value derived for the retimed register may be different from the initial value of the existing register. Conflicts that arise in deriving initial values of retimed registers may be resolved by identifying dominant logic immediately following the retimed register. If dominant logic is present, the retimed register(s) can take a don't-care value (i.e., either logic 0 or logic 1 as the initial value.

Figure 2:
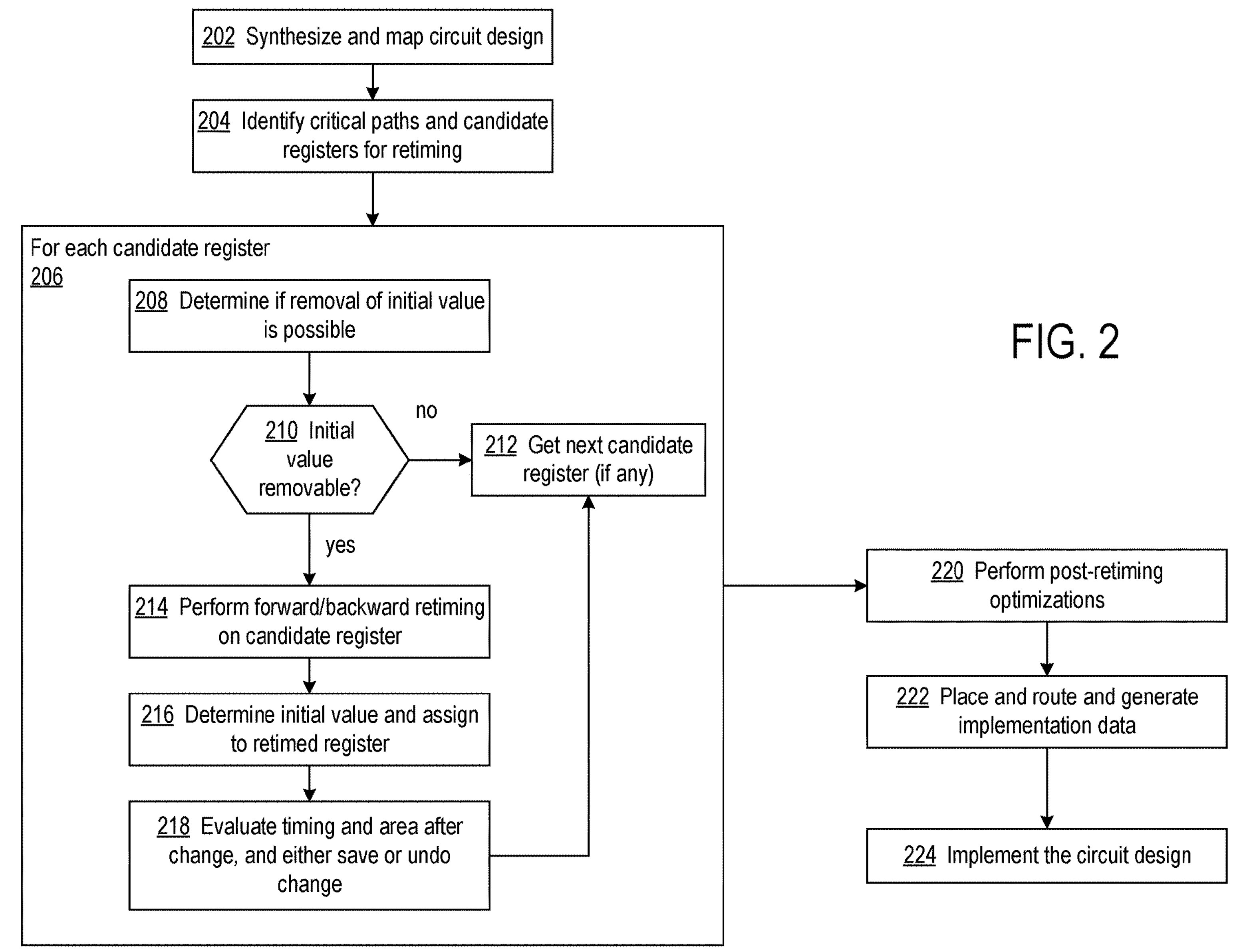
FIG. 2 shows a flowchart of an exemplary design flow that includes retiming.

FIG. 2 shows a flowchart of an exemplary design flow that includes retiming. At block 202, the design tool synthesizes the circuit design into a netlist and maps the logic and registers to circuit elements of a target integrated circuit (IC). In the process of synthesizing a design, the design is realized as a technology-independent directed graph having nodes that represent registers and edges that represent combinational logic. Timing-driven synthesis inputs timing constraints that provide timing requirements, and the design tool optimizes the logic to satisfy the timing constraints. At block 204, the design tool scans the netlist to identify critical paths. The design tool can determine where timing can be improved by balancing logic levels or driving high-fanout nets by combinational logic rather than registers.

Registers may be retimed in order to balance logic levels or change the driving of high-fanout nets. At block 206, the design tool performs the operations of blocks 208 and 210, and conditionally performs the operations of blocks 212, 214, 216, and 218 for each register that is a candidate for retiming. At block 208, the design tool determines whether or not the initial value of the candidate register can be removed, and thereby whether or not the candidate register can be retimed. The initial values of registers and combinational logic in the logic cones of the candidate register affect whether or not that register can be retimed. The operations of block 208 are further detailed in the flowchart of FIG. 3.

At decision block 210, in response to finding that the initial value cannot be removed, the process continues to block 212 to get the next candidate register to be processed according to the collection of operations in block 206. Otherwise, in response to finding that the initial value can be removed, the design tool proceeds to block 214.

At block 214, the design tool retimes the candidate register, either backward or forward, according to recognized criteria and procedures of optimization algorithms implemented by the design tool. At block 216, the design tool determines the initial value of the retimed register(s). For a forward retimed register, the initial values of the starting points are used to derive the initial value of the retimed register. For backward retimed registers, the initial values are derived from initial values of the reachable endpoints. Conflicting initial values arising from the retimed register can be resolved if dominant logic can be identified in the output logic cone of the retimed register. The operations of block 216 are further detailed in the flowchart of FIG. 4.

At block 218, the design tool evaluates the circuit design, as changed by the retimed register(s), to determine whether or not timing and/or area constraints are satsified. In response to finding that the constraints are satisfied, the changed circuit design is saved for use in retiming other registers, if needed. Otherwise, the design tool undoes the changes made to the circuit design by restoring the candidate register and deleting the retimed register(s). The design tool proceeds to block 220 in response having processed all candidate registers. At block 220, the design tool performs known post-retiming optimizations.

At block 222, the optimized netlist is placed and routed, and configuration data is generated based on the placed-and-routed design. For example, place-and-route and bitstream generation components of the design tool may be executed to generate configuration data for an FPGA. Other tools can generate configuration data from which an application-specific (ASIC) can be fabricated. At block 224, a circuit can be implemented by way of configuring a programmable IC with the configuration data or fabricating, making, or producing an ASIC from the configuration data, thereby creating a circuit that operates according to the resulting circuit design.

Figure 3:
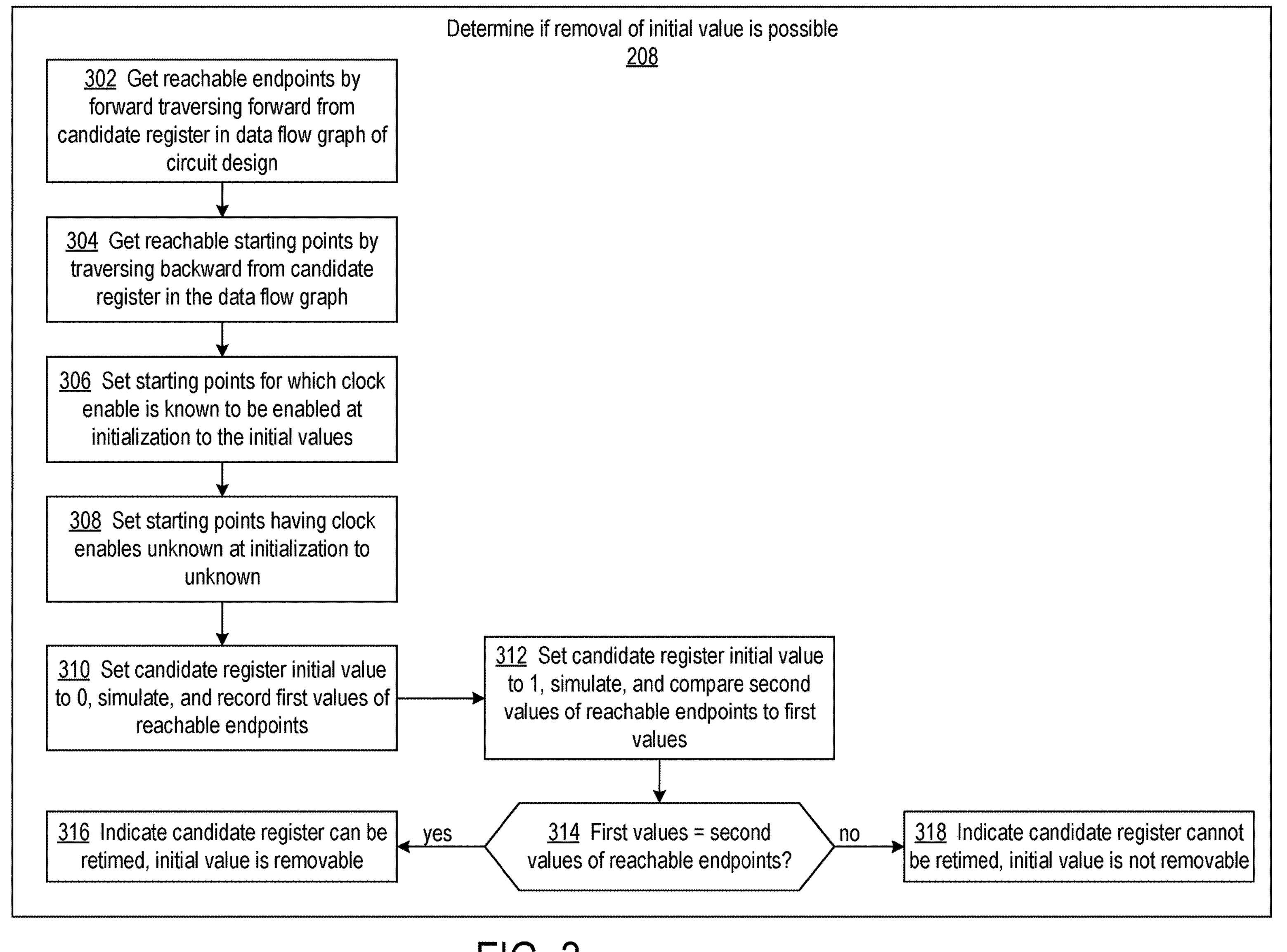
FIG. 3 shows a flowchart of an exemplary process that determines whether or not an initial value of a candidate register can be removed in a circuit design.

FIG. 3 shows a flowchart of an exemplary process that determines whether or not an initial value of a candidate register can be removed in a circuit design. If the initial value can be removed, then the candidate register is eligible for retiming. At block 302, the design tool finds the reachable endpoints from the candidate register, and at block 304, the design tool finds the starting points from the candidate register. The reachable endpoints can be determined by traversing the directed graph from the candidate register forward to registers and primary outputs that are reachable from the candidate register. In response to encountering a register or a primary output in traversing the graph, the design tool tags the register/primary output as a reachable endpoint and begins traversing another path in the graph. That is, the design tool does not traverse a path any further once a register is encountered.

The starting points can be determined by traversing the directed graph from the candidate register backward to registers and primary inputs from the candidate register. In response to encountering a register or a primary input in traversing the graph, the design tool tags the register/primary input as a starting point and begins traversing another path in the graph. That is, the design tool does not traverse a path any further once a register is encountered.

At blocks 306 and 308, the design tool sets the states of the starting points according to whether or not the states of the signals at the clock enable pins of the starting points are known to be enabled at initialization time. For starting points that are registers and have clock enable pins connected to signals known to be enabled at initialization time, at block 306 the design tool sets the starting points to the initial values specified by the circuit design. For starting points having clock enable pins connected to signals having unknown states at initialization time, the design tool sets the starting points to "unknown." For a starting point that is a primary input, in response to the value being known at initialization time, the design tool sets the initial value to that known value. Otherwise, the design tool sets the value of that primary input to unknown.

The design tool runs a first simulation at block 310, and then a second simulation at block 312. In the first simulation, the design tool sets the candidate register to an initial value of logic 0, and sets the candidate register to an initial value of logic 1 in the second simulation. In each simulation, the design tool runs the simulation for the number of clock cycles needed to allow the candidate register to receive the result of input logic cone acting on the initial values of the starting points, plus the number of cycles needed for the output logic cone act on the result in the candidate register and generate result values at the reachable endpoints.

The result values at the reachable endpoints are saved at the end of the first and second simulations, and at decision block 314 the design tool compares the two sets of result values. In response to finding that each result value from the first simulation is found to be equal to the corresponding result value from the second simulation, at block 316 the design tool indicates that the initial value of the candidate register can be removed, and the candidate register can be retimed. Otherwise, at block 318 the design tool indicates that the register cannot be retimed.

Figure 4:
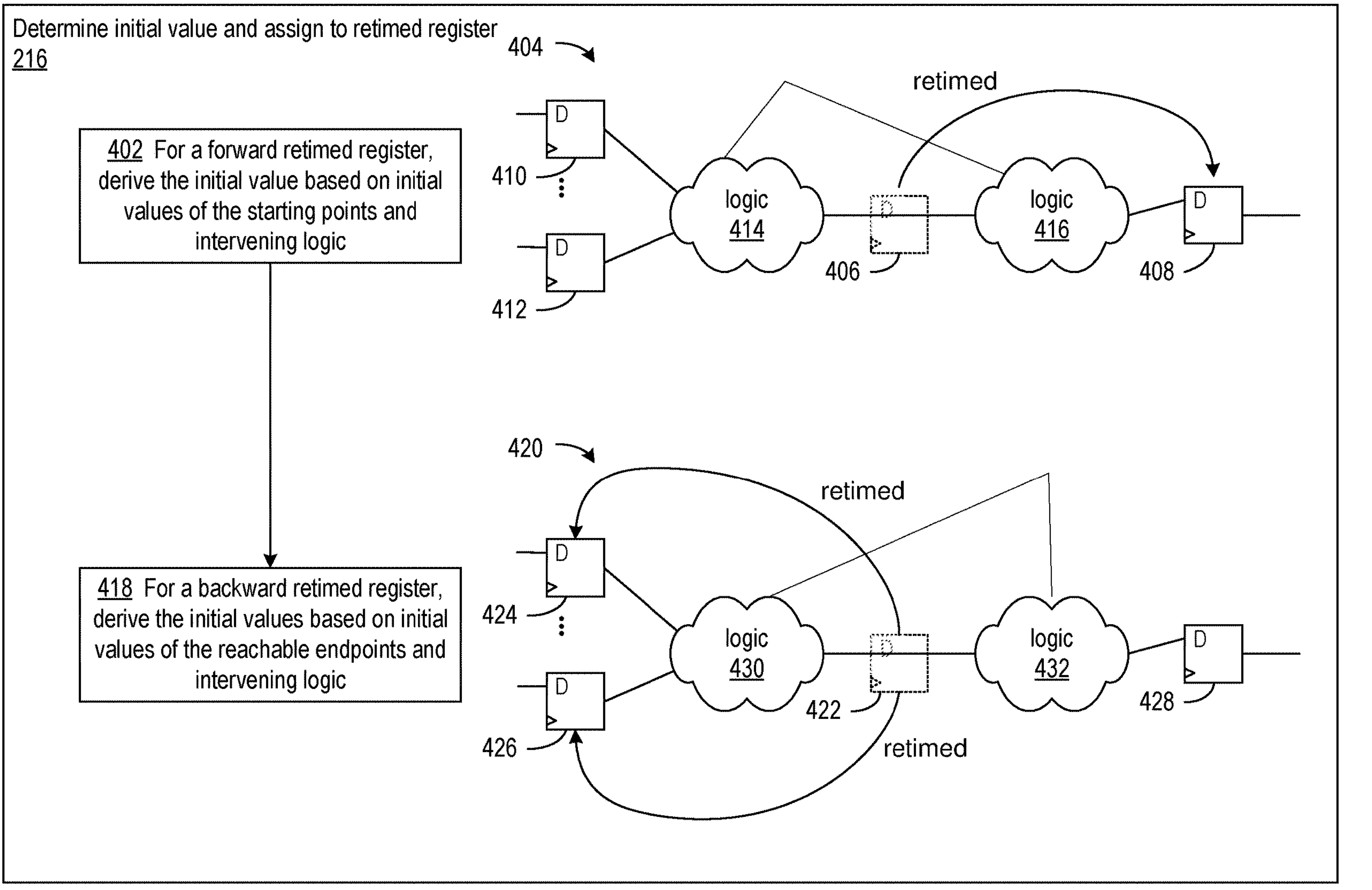
FIG. 4 shows a flowchart of an exemplary process that determines the initial value of a retimed register.

FIG. 4 shows a flowchart of an exemplary process that determines the initial value of a retimed register. At block 402, the design tool determines the initial value of a forward retimed register. In the exemplary logic 404, dashed block 406 is the candidate register, and block 408 is the retimed register. The design tool derives the initial value of the retimed register 408 based on the initial values of the starting points 410, . . . , 412 and combinational logic circuits 414 and 416. In deriving the initial value, the design tool applies the initial values of the starting points 410, . . . , 412 to the combinational logic circuit, followed by applying the combinational logic circuit 416 to the value output from the combinational logic circuit 414.

At block 418, the design tool determines the initial values of backward retimed registers. In the exemplary logic 420, dashed block 422 is the candidate register, and blocks 424, . . . , 426 are the retimed registers. The design tool derives the initial value of the retimed registers 424, . . . , 426 based on the initial value of register 428 and combinational logic circuits 430 and 432. In deriving the initial values of the backward retimed registers, the design tool determines the combination of initial values of the registers 424, . . . , 426 that cause the combinational logic circuits 430 and 432 to produce the required initial value of output register 428. The design tool applies possible combinations of initial values of retimed registers 424, . . . , 426 to the combinational logic circuit 430 followed by applying the combinational logic 432 to the value output from the combinational logic 430.

In some instances, conflicts can arise between initial values of retimed registers and initial values of other registers. For example, assigning initial values to a group of backward retimed registers may be infeasible such that the outputs of the combinational logic cells produce the same initial values of the candidate registers. In another example, some retimed registers may have preferred initial values for purposes of resource sharing, but the candidate registers may have conflicting initial values. In another example, some registers may have limited initialization capability for certain hardware.

Figures 5, 6:
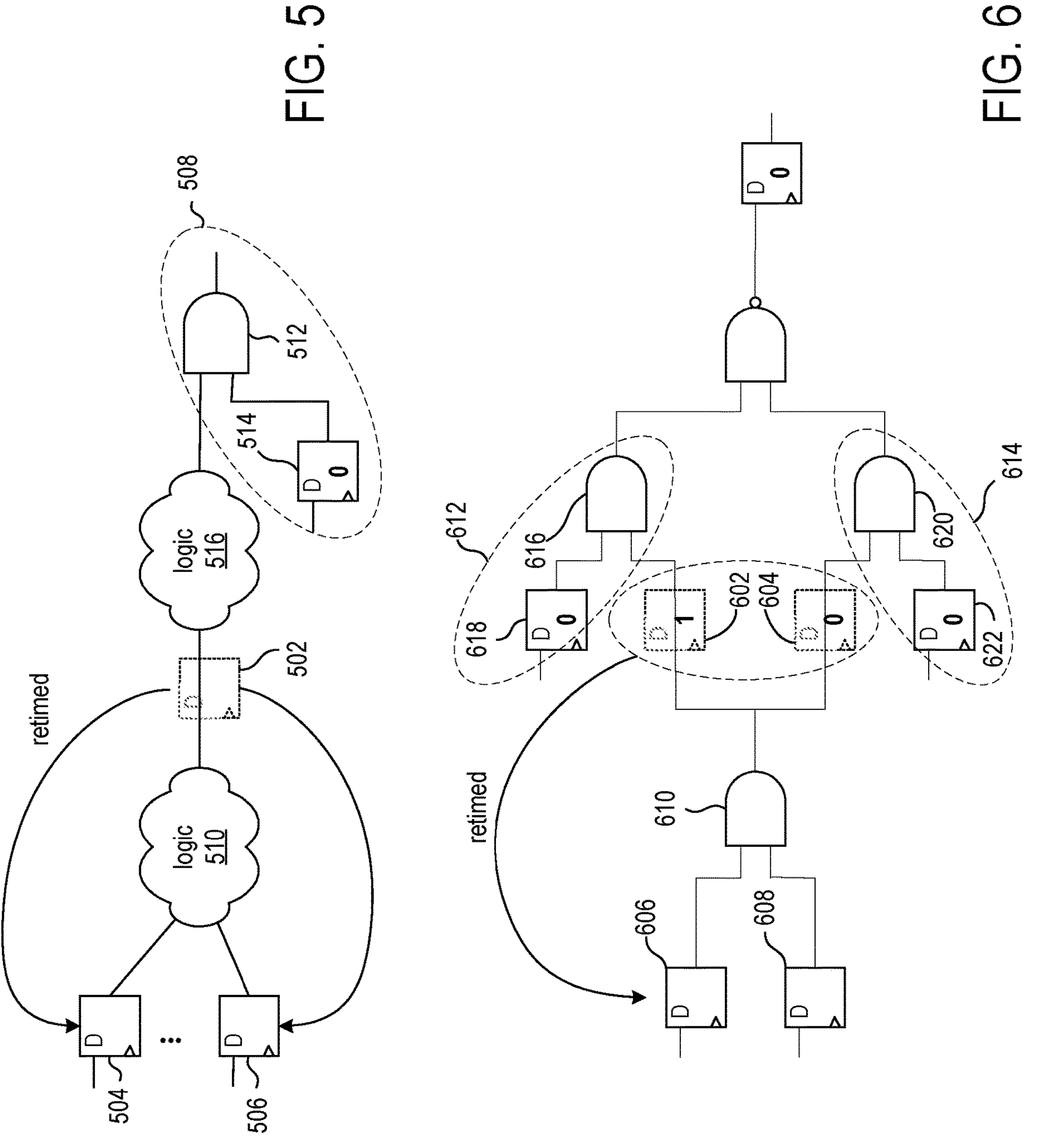
FIG. 5 shows an example of a candidate register that has been backward retimed to retimed registers.
FIG. 6 shows an example of two candidate registers that have been backward retimed.
Figure 7:
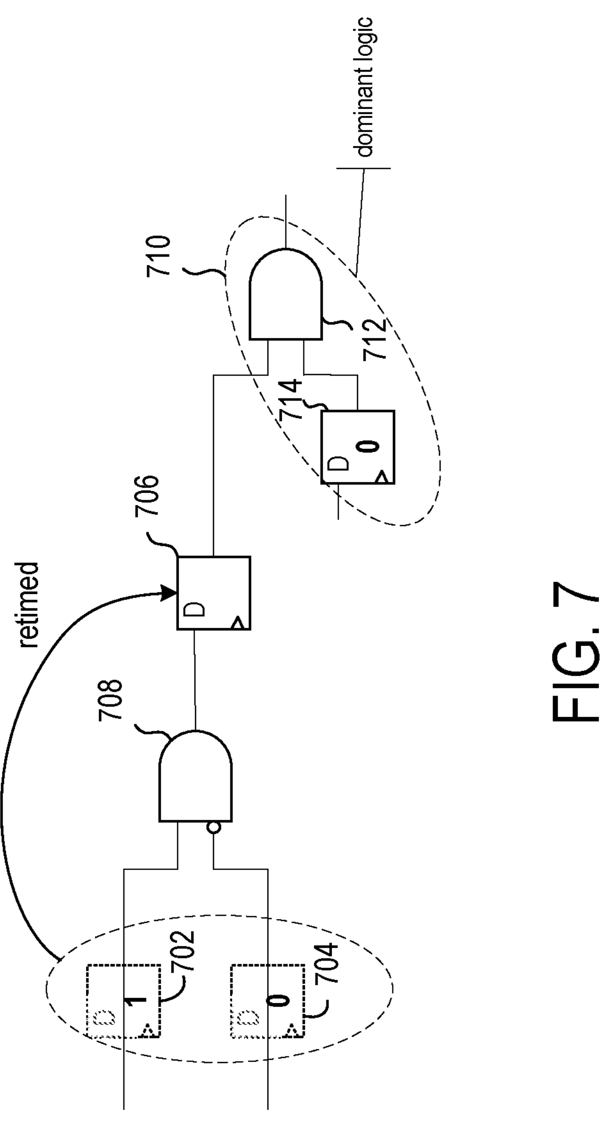
FIG. 7 shows an example of two candidate registers that have been forward retimed to retimed.

In cases where conflicts between initialization values arise, the design tool can determine whether or not dominant logic is present in the logic that follows the retimed register. If dominant logic is present, the design tool can save the modified design. Otherwise, the design tool can undo the changes are attempt other changes to satisfy design constraints. FIGS. 5, 6, and 7 show examples of dominant logic that can be identified to resolve conflicting initial values.

FIG. 5 shows an example of a candidate register 502 that has been backward retimed to retimed registers 504, . . . , 506. The dominant logic 508 can be identified by the design tool to resolve a conflict of initial values of retimed registers 504, . . . , 506 and initial values of other registers (not shown) that provide input signals to the logic 510.

The dominant logic includes AND gate 512 and register 514. Register 514 has an initial value of logic 0, which makes the output of AND gate 512 logic 0, independent of the logic value of the signal generated by logic 510 and 516 in response to the initial values of retimed registers 504, . . . , 506. In response to finding the dominant logic 508, the design tool can specify initial values of either logic 0 or logic 1 (don't care values) for the retimed registers.

FIG. 6 shows an example of two candidate registers 602 and 604 that have been backward retimed as retimed registers 606 and 608. The output signal from AND gate 610 is provided as input to both of candidate registers 602 and 604. However, candidate registers 602 and 604 have conflicting initial values of logic 1 and logic 0, respectively.

The example includes instances 612 and 614 of dominant logic. The instance 612 of dominant logic includes AND gate 616 and register 618 having an initial value logic 0, and the instance 614 of dominant logic includes AND gate 620 and register 622 having an initial value logic 0. The output of AND gate 616 is logic 0 independent of the initial value of candidate register 602, and the output of AND gate 620 is logic 0 independent of the initial value of candidate register 622. The instances of dominant logic allow the design tool to specify initial values of either logic 0 or logic 1 (don't care values) for the retimed registers 606 and 608.

FIG. 7 shows an example of two candidate registers 702 and 704 that have been forward retimed to retimed register 706. Candidate registers 702 and 704 have conflicting initial values and are input to AND gate 708. The dominant logic 710 can be identified by the design tool to determine the initial value of retimed register 706. The dominant logic includes AND gate 712 and register 714. Register 714 has an initial value of logic 0, which makes the output of AND gate 712 logic 0, independent of the logic value of the signal output from retimed register 706. In response to finding the dominant logic 710, the design tool can specify an initial value of either logic 0 or logic 1 (don't care values) for the retimed register.

Figure 8:
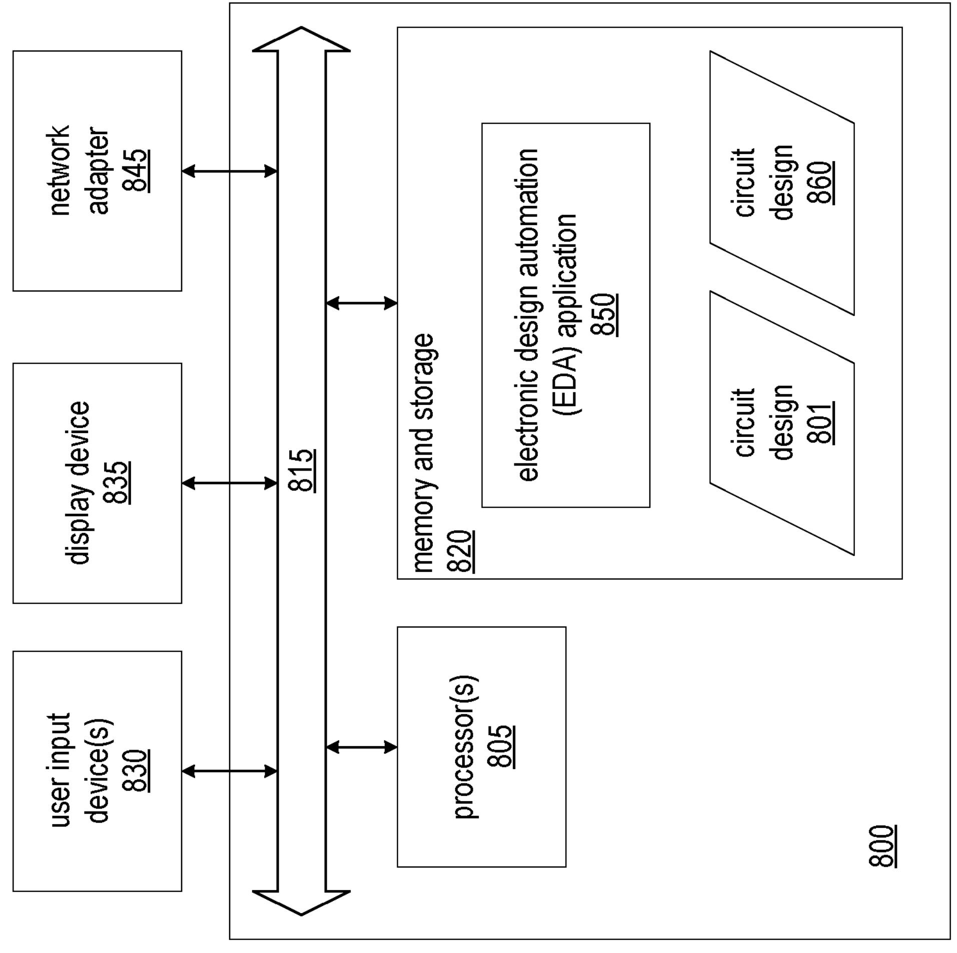
FIG. 8 is a block diagram illustrating an exemplary data processing system

FIG. 8 is a block diagram illustrating an exemplary data processing system (system) 800. Retiming optimizations performed by system 800 modify circuit design 801 to improve one or more aspects of circuit performance. For example, system 800 may perform a local retiming optimization to improve timing, reduce area usage, and/or reduce power consumption of circuit design 801.

System 800 is an example of an EDA system. As pictured, system 800 includes at least one processor circuit (or "processor"), e.g., a central processing unit (CPU) 805 coupled to memory and storage arrangement 820 through a system bus 815 or other suitable circuitry. System 800 stores program code and circuit design 801 within memory and storage arrangement 820. Processor 805 executes the program code accessed from the memory and storage arrangement 820 via system bus 815. In one aspect, system 800 is implemented as a computer or other data processing system that is suitable for storing and/or executing program code. It should be appreciated, however, that system 800 can be implemented in the form of any system including a processor and memory that is capable of performing the functions described within this disclosure.

Memory and storage arrangement 820 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 800 may also include one or more cache memories (not shown) that provide temporary storage of at least some program code and data in order to reduce the number of times program code and data must be retrieved from local memory and persistent storage during execution.

Input/output (I/O) devices such as user input device(s) 830 and a display device 835 may be optionally coupled to system 800. The I/O devices may be coupled to system 800 either directly or through intervening I/O controllers. A network adapter 845 also can be coupled to system 800 in order to couple system 800 to other systems, computer systems, remote printers, and/or remote storage devices through intervening private or public networks. Modems, cable modems, Ethernet cards, and wireless transceivers are examples of different types of network adapter 845 that can be used with system 800.

Memory and storage arrangement 820 may store an EDA application 850. EDA application 850, being implemented in the form of executable program code, is executed by processor(s) 805. As such, EDA application 850 is considered part of system 800. System 800, which is configured as a design tool while executing EDA application 850, receives and operates on circuit design 801. In one aspect, system 800 performs a design flow on circuit design 801, and the design flow may include synthesis, mapping, retiming, placement, routing, and generation of implementation data. System 800 generates an optimized, or modified, version of circuit design 801 as circuit design 860.

EDA application 850, circuit design 801, circuit design 860, and any data items used, generated, and/or operated upon by EDA application 850 are functional data structures that impart functionality when employed as part of system 800 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for optimizing circuit designs. Other aspects and features will be apparent to those skilled in the art from consideration of the specification. The methods and system may be implemented as one or more processors configured to execute software or a tangible computer readable medium. It is intended that the specification and drawings be considered as examples only, with a true scope of the invention being indicated by the following claims.

What is claimed is:

1. A method comprising:

determining by a design tool whether or not an initial value specified for a candidate register can be removed based on an input logic cone to the candidate register and an output logic cone from the candidate register, including setting the initial value to a logic 0 and to a logic 1, and determining the initial value can be removed when reachable endpoints in the output logic cone match both settings, wherein the candidate register is a register in a critical path in a circuit design;

retiming the candidate register into a retimed register by the design tool in response to determining that the initial value specified for the candidate register can be removed;

deriving a new initial value for the retimed register by the design tool based on initial values of registers in a logic cone of the retimed register; and assigning the new initial value to the retimed register by the design tool.

2. The method of claim 1, wherein the retiming includes backward retiming the candidate register.

3. The method of claim 2, wherein the deriving the new initial value includes deriving the new initial value based on initial values of starting points of the input logic cone.

4. The method of claim 1, wherein the retiming includes forward retiming the candidate register.

5. The method of claim 4, wherein the deriving the new initial value includes deriving the new initial value based on initial values of reachable endpoints of the output logic cone.

6. The method of claim 5, further comprising:

setting each starting point that is a register to an initial value of the register in response to the register having a clock enable pin coupled to a signal that is known to be in an enabled state at initialization; and setting each starting point that is a register to an unknown value in response to the register having a clock enable pin coupled to a signal having an unknown state at initialization.

7. The method of claim 1, wherein the deriving the new initial value includes:

determining whether or not a known logic value is output from combinational logic connected to an output of the candidate register, independent of an initial value of the retimed register; and indicating that the new initial value can be either logic 0 or logic 1 in response to determining that the known logic value is output.

8. The method of claim 1, wherein the determining whether or not the initial value specified for the candidate register can be removed includes:

performing a first simulation of the circuit design with the candidate register having an initial value logic 0;

performing a second simulation of the circuit design with the candidate register having an initial value logic 1; and indicating that the initial value specified for the candidate register can be removed in response to values of reachable endpoints of the output logic cone at completion of the first simulation being equal to values of the reachable endpoints at completion of the second simulation.

9. The method of claim 1, further comprising:

evaluating the circuit design to determine whether or not a timing constraint is satisfied after retiming the candidate register; and restoring the candidate register to and deleting the retimed register from the circuit design in response to determining that the timing constraint is not satisfied.

10. The method of claim 1, further comprising:

placing and routing the circuit design; and generating configuration data after the placing and routing for implementing an integrated circuit.

11. A system comprising:

one or more computer processors configured to execute program code; and a memory arrangement coupled to the one or more computer processors, wherein the memory arrangement is configured with instructions of a design tool that when executed by the one or more computer processors cause the one or more computer processors to perform operations including:

determining whether or not an initial value specified for a candidate register can be removed based on an input logic cone to the candidate register and an output logic cone from the candidate register, including setting the initial value to a logic 0 and to a logic 1, and determining the initial value can be removed when reachable endpoints in the output logic cone match both settings, wherein the candidate register is a register in a critical path in a circuit design;

retiming the candidate register into a retimed register in response to determining that the initial value specified for the candidate register can be removed;

deriving a new initial value for the retimed register based on initial values of registers in a logic cone of the retimed register; and assigning the new initial value to the retimed register.

12. The system of claim 11, wherein the instructions for retiming include instructions for backward retiming the candidate register.

13. The system of claim 12, wherein the instructions for deriving the new initial value include instructions for deriving the new initial value based on initial values of starting points of the input logic cone.

14. The system of claim 11, wherein the instructions for retiming include instructions for forward retiming the candidate register.

15. The system of claim 14, wherein the instructions for deriving the new initial value include instructions for deriving the new initial value based on initial values of reachable endpoints of the output logic cone.

16. The system of claim 15, wherein the memory arrangement is configured with instructions of the design tool that when executed by the one or more computer processors cause the one or more computer processors to perform operations including:

setting each starting point that is a register to an initial value of the register in response to the register having a clock enable pin coupled to a signal that is known to be in an enabled state at initialization; and setting each starting point that is a register to an unknown value in response to the register having a clock enable pin coupled to a signal having an unknown state at initialization.

17. The system of claim 11, wherein the instructions for deriving the new initial value include instructions for:

determining whether or not a known logic value is output from combinational logic connected to output of the candidate register, independent of an initial value of the retimed register; and indicating that the new initial value can be either logic 0 or logic 1 in response to determining that the known logic value is output.

18. The system of claim 11, wherein the instructions for determining whether or not the initial value specified for the candidate register can be removed include instructions for:

performing a first simulation of the circuit design with the candidate register having an initial value logic 0;

performing a second simulation of the circuit design with the candidate register having an initial value logic 1; and indicating that the initial value specified for the candidate register can be removed in response to values of reachable endpoints of the output logic cone at completion of the first simulation being equal to values of the reachable endpoints at completion of the second simulation.

19. The system of claim 11, wherein the memory arrangement is configured with instructions of the design tool that when executed by the one or more computer processors cause the one or more computer processors to perform operations including:

evaluating the circuit design to determine whether or not a timing constraint is satisfied after retiming the candidate register; and restoring the candidate register to and deleting the retimed register from the circuit design in response to determining that the timing constraint is not satisfied.

20. The system of claim 11, wherein the memory arrangement is configured with instructions of the design tool that when executed by the one or more computer processors cause the one or more computer processors to perform operations including:

placing and routing the circuit design; and generating configuration data after the placing and routing for implementing an integrated circuit.

* * * * *